(12) United States Patent
Nagai

(10) Patent No.: US 12,217,639 B2
(45) Date of Patent: Feb. 4, 2025

(54) CONTROL DEVICE, ELECTRONIC DEVICE, HEAD-MOUNTED DISPLAY DEVICE, CONTROL METHOD, AND NON-TRANSITORY COMPUTER-READABLE STORAGE MEDIUM STORING CONTROL PROGRAM

(71) Applicant: SEIKO EPSON CORPORATION, Tokyo (JP)

(72) Inventor: Kazuki Nagai, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/454,082

(22) Filed: Aug. 23, 2023

(65) Prior Publication Data
US 2024/0071268 A1    Feb. 29, 2024

(30) Foreign Application Priority Data
Aug. 26, 2022    (JP) .................. 2022-134622

(51) Int. Cl.
*G09G 3/00*    (2006.01)
(52) U.S. Cl.
CPC ..... *G09G 3/001* (2013.01); *G09G 2320/0626* (2013.01); *G09G 2340/00* (2013.01); *G09G 2360/14* (2013.01); *G09G 2370/00* (2013.01)

(58) Field of Classification Search
CPC .............. G09G 3/001; G09G 2340/00; G09G 2320/0626; G09G 2360/14; G09G 2370/00
USPC .......................................................... 345/207
See application file for complete search history.

(56) References Cited

U.S. PATENT DOCUMENTS

| 2016/0316243 | A1* | 10/2016 | Park | H04N 21/25858 |
| 2018/0120132 | A1* | 5/2018 | Tanutama | G01D 18/00 |
| 2019/0197989 | A1* | 6/2019 | Kimura | G09G 5/12 |

FOREIGN PATENT DOCUMENTS

JP    2019114049    7/2019

* cited by examiner

*Primary Examiner* — Mark Edwards
(74) *Attorney, Agent, or Firm* — JCIPRNET

(57) ABSTRACT

A control device including a device coupling unit coupled to an electronic device, and a processing unit configured to execute an application program configured to process sensor data related to a sensor provided in the electronic device, in which the electronic device determines whether an algorithm language related to processing of a detection value of the sensor is receivable, and transmits the algorithm language to the electronic device when determining that the algorithm language is receivable.

10 Claims, 6 Drawing Sheets

CONTROL DEVICE, ELECTRONIC DEVICE, HEAD-MOUNTED DISPLAY DEVICE, CONTROL METHOD, AND NON-TRANSITORY COMPUTER-READABLE STORAGE MEDIUM STORING CONTROL PROGRAM

The present application is based on, and claims priority from JP Application Serial Number 2022-134622, filed Aug. 26, 2022, the disclosure of which is hereby incorporated by reference herein in its entirety.

BACKGROUND

1. Technical Field

The present disclosure relates to a control device, an electronic device, a head-mounted display device, a control method, and a non-transitory computer-readable storage medium storing a control program.

2. Related Art

In the related art, a technique is known in which an electronic device including a sensor is coupled to a computer and data of the sensor of the electronic device is used in the computer. For example, the host device disclosed in JP-A-2019-114049 processes sensor data related to a 9-axis sensor and the like mounted in an HMD (Head Mounted Display), which is a type of electronic device, with an application program.

Some electronic devices including a sensor have a function of processing the detection value of the sensor. There are various methods for using the detection value of the sensor, and therefore if it can be changed in accordance with the use of the electronic device and the like, the usability of the electronic device is expected to be increased. However, the processing related to the detection value of the sensor is generally provided in the firmware of the electronic device, and as such it is difficult to change the content of the processing and the like.

SUMMARY

An aspect of the present disclosure is a control device including a device coupling unit coupled to an electronic device, and a processing unit configured to execute an application program configured to process sensor data related to a sensor provided in the electronic device, in which the electronic device determines whether an algorithm language related to processing of a detection value of the sensor is receivable, and transmits the algorithm language to the electronic device when determining that the algorithm language is receivable.

Another aspect of the present disclosure is an electronic device to be worn and used by a user, the electronic device including a sensor, a terminal coupling unit coupled to a control device, a data processing unit configured to generate sensor data by processing a detection value of the sensor, and transmit the generated sensor data to the control device by the terminal coupling unit, and an acquiring unit configured to acquire an algorithm language transmitted from the control device, in which the data processing unit determines a processing of a detection value of the sensor based on the algorithm language acquired by the acquiring unit, and generates the sensor data by executing the determined processing.

Another aspect of the present disclosure is a head-mounted display device including a display unit configured to be worn on a head of a user and configured to display an image, a sensor mounted in the display unit, a terminal coupling unit coupled to a control device, a data processing unit configured to generate sensor data by processing a detection value of the sensor, and transmit the generated sensor data to the control device by the terminal coupling unit, and an acquiring unit configured to acquire an algorithm language transmitted from the control device, in which based on the algorithm language acquired by the acquiring unit, the data processing unit executes a first processing and a second processing by switching between the first processing and the second processing, the first processing being a processing of transmitting the sensor data including the detection value of the sensor to the control device, the second processing being a processing of generating and transmitting, to the control device, the sensor data including processed data obtained by processing the detection value of the sensor.

Another aspect of the present disclosure is a control method configured to be executed by a control device coupled to an electronic device, the control method including determining, by the electronic device, whether an algorithm language related to processing of a detection value of a sensor is receivable, transmitting the algorithm language to the electronic device when determining that the algorithm language is receivable, receiving sensor data, the sensor data being data transmitted by the electronic device based on the algorithm language and related to a sensor provided in the electronic device, and processing the sensor data with an application program.

Another aspect of the present disclosure is a non-transitory computer-readable storage medium storing a control program configured to be executed by a processor provided in a control device coupled to an electronic device, the control program being configured to cause the processor to execute steps of: determining, by the electronic device, whether an algorithm language related to processing of a detection value of a sensor is receivable, transmitting the algorithm language to the electronic device when determining that the algorithm language is receivable, receiving sensor data, the sensor data being data transmitted by the electronic device based on the algorithm language and related to a sensor provided in the electronic device, and processing the sensor data with an application program.

DESCRIPTION OF EMBODIMENTS

An embodiment is described below with reference to the accompanying drawings.

1. Configuration of Display System

Figure 1:
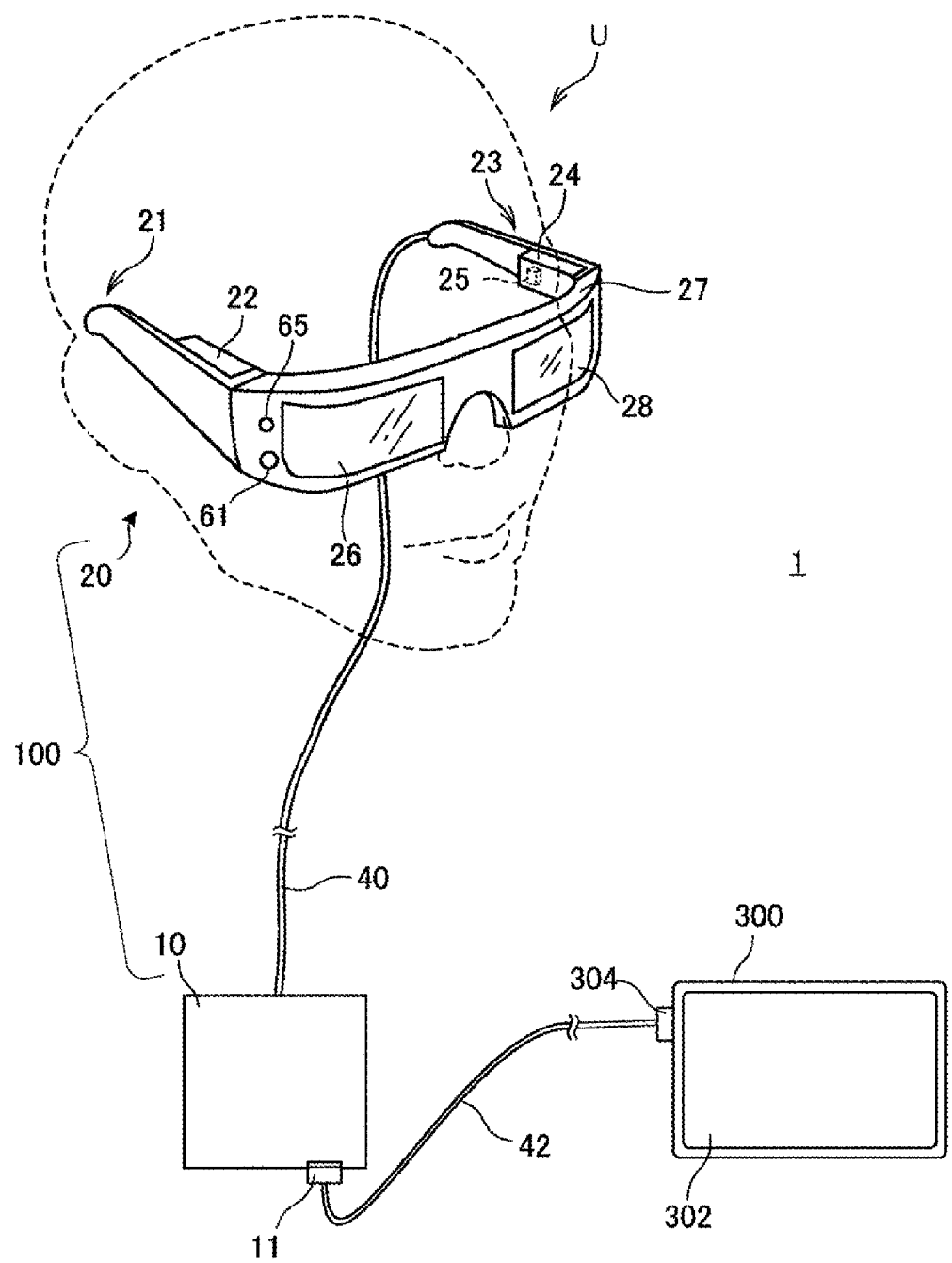
FIG. 1 is a schematic view illustrating a display system according to an embodiment.

FIG. 1 is a diagram illustrating a configuration of a display system 1 according to an embodiment to which the present disclosure is applied.

The display system 1 includes an HMD (Head Mounted Display) 100, and a host device 300.

The HMD 100 is a head-mounted display device including a display unit 20 that causes the user U to visually recognize a virtual image in the state where it is worn on the user U, and a coupling device 10 that controls the display unit 20. The HMD 100 corresponds to an example of the electronic device. The HMD 100 includes a built-in power source such as a battery not illustrated in the drawing, and operates with the power of the power source. The HMD 100 may be configured to receive power from the outside through a communication cable 42 described later and the like.

The display unit 20 is a wearable member that is configured to be worn on the head of the user U, and has a form of eyeglasses, for example. The display unit 20 includes a right display unit 22, a left display unit 24, a right light guide plate 26, and a left light guide plate 28 in a main body including a right holding part 21, a left holding part 23, and a front frame 27.

The right holding part 21 and the left holding part 23 extend rearward from the both end portions of the front frame 27, and hold the display unit 20 at the head of the user U in a manner like temples of eyeglasses.

The right display unit 22 and the left display unit 24 are composed of an OLED (Organic Light Emitting Diode) that emits light through organic electroluminescence, and output image light for right and left eyes of the user U, respectively, for example.

The right light guide plate 26 and the left light guide plate 28 are prisms, for example. The right light guide plate 26 transmits and guides external light to the right eye of the user U, and guides the right image light from the right display unit 22 provided in the right holding part 21 to the right eye of the user U to cause the right eye to visually recognize the image. The left light guide plate 28 transmits and guides external light to the left eye of the user U, and guides the left image light from the left display unit 24 provided in the left holding part 23 to the left eye of the user U to cause the left eye to visually recognize the image.

In this manner, the display unit 20 allows the user U to visually recognize the external scenery, and displays images by causing the user U to visually recognize the virtual image with the image light of the right display unit 22 and the left display unit 24. Specifically, the display unit 20 functions as a see-through display device that includes a display region configured to enable visual recognition of the external scenery, and generates an image on the front side of the line of sight of the user U with the above-described display region when worn on the head of the user U.

The coupling device 10 is coupled to the display unit 20 with a connection cable 40. Further, the coupling device 10 is coupled to the host device 300 through the communication cable 42 coupled with a connector 11. The connector 11 corresponds to an example of the terminal coupling unit.

The host device 300 is an electronic device with a function of transmitting and receiving images and various data, and may be referred to as terminal device. The host device 300 corresponds to an example of the control device. The host device 300 is a mobile or transportable small-sized computer. For example, the host device 300 is a smartphone, a tablet computer, or a note-type computer. The host device 300 of this embodiment includes a touch panel 302 that serves both as a display screen and an input device for detecting touch operations. The host device 300 includes a built-in power source such as a battery not illustrated in the drawing, and operates with the power of the power source. The host device 300 may be configured to receive power from the outside through a power cable not illustrated in the drawing and the like.

The host device 300 includes a connector 304 to which the communication cable 42 is coupled. The connector 304 is a coupling terminal in compliance with USB (Universal Serial Bus) standard, and in this case, the communication cable 42 is a USB cable, for example. The connector 304 corresponds to an example of the device coupling unit.

The host device 300 and the coupling device 10 are not limited to the wired configuration where they are coupled through the communication cable 42, and may be coupled to each other through wireless communications, for example.

By communicating with the coupling device 10, the host device 300 outputs image data or video signals to the coupling device 10 to display images on the display unit 20. The video signal and image data are collectively referred to as image.

The host device 300 acquires the sensor data based on the detection value of the sensor provided in the HMD 100 from the coupling device 10. As described later, the host device 300 achieves various functions by executing an application program. The host device 300 has a function of processing the sensor data with the application program. The sensor data will be described later.

The coupling device 10 receives images output by the host device 300. The coupling device 10 displays the image received from the host device 300 on the display unit 20 by controlling the right display unit 22 and the left display unit 24 of the display unit 20.

The coupling device 10 outputs sensor data to the host device 300. The coupling device 10 acquires, as a detection value, the detection value of a 9-axis sensor 25, the detection value of illuminance sensor 65, the detection value of a line-of-sight sensor 67, and captured image data of a camera 61, for example. Specifically, the 9-axis sensor 25, the illuminance sensor 65, the line-of-sight sensor 67, and the camera 61 correspond to examples of the sensor provided in the HMD 100. The coupling device 10 acquires the detection values of the sensors. The coupling device 10 generates sensor data based on the detection value of the sensor, and outputs the generated sensor data to the host device 300.

The sensor data is data including the detection value of the sensor itself, for example. The data of this type is referred to as raw data. In addition, the sensor data may be data generated by processing the detection value of the sensor by the HMD 100.

2. Configuration of HMD

Figure 2:
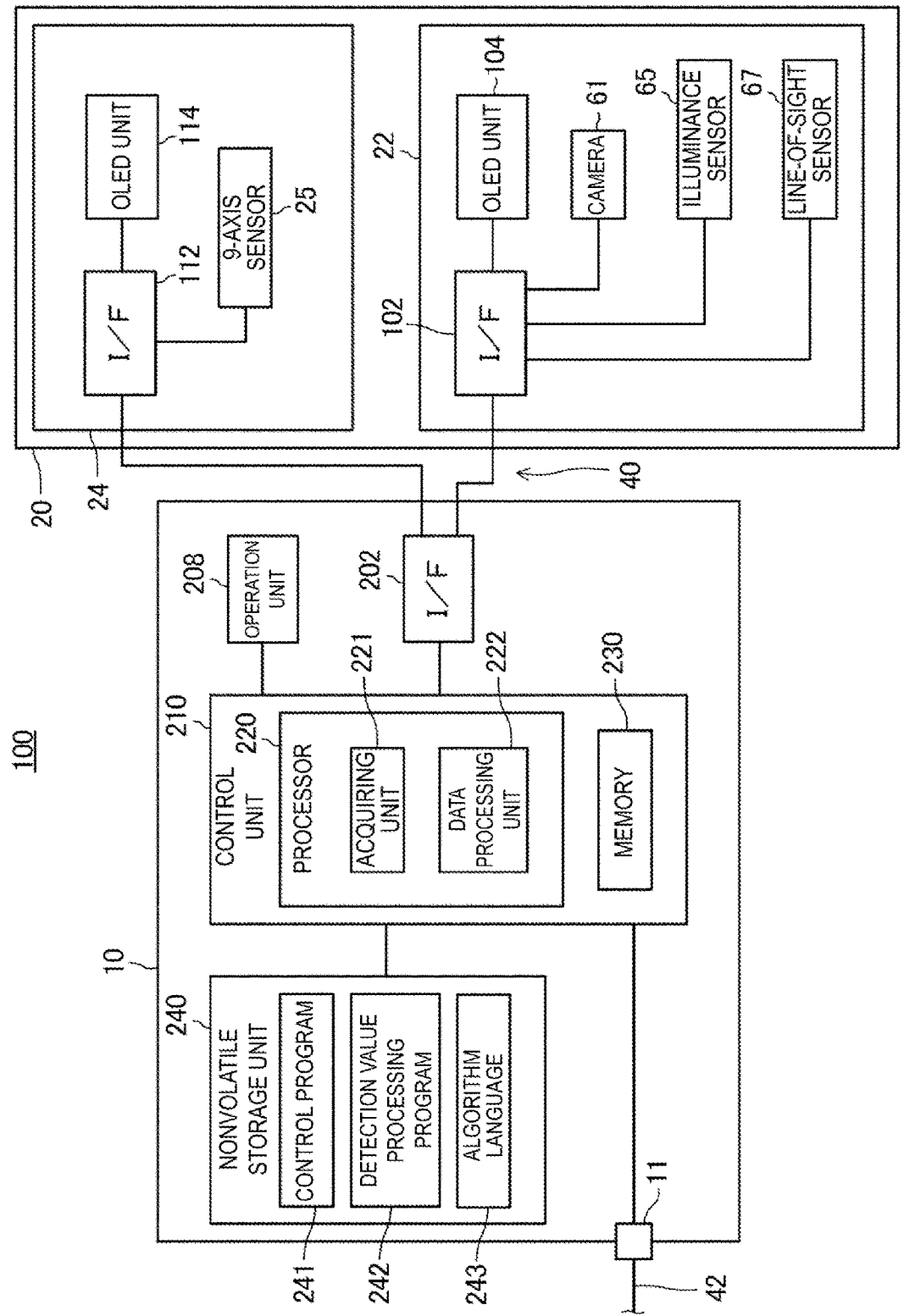
FIG. 2 is a block diagram illustrating a configuration of an HMD.

FIG. 2 is a block diagram illustrating a configuration of the HMD 100.

The right display unit 22 of the display unit 20 includes an interface 102. In addition, the left display unit 24 includes an interface 112. The interfaces 102 and 112 are coupled to the coupling device 10 through the communication cable 42. The interfaces 102 and 112 receive the image transmitted from the coupling device 10, and transmit the detection value of the sensor to the coupling device 10. In FIG. 2, the interface is abbreviated as I/F.

The right display unit 22 includes the camera 61, the illuminance sensor 65, the line-of-sight sensor 67, and an OLED unit 104.

The display unit 20 includes the camera 61, the illuminance sensor 65, and the line-of-sight sensor 67 described later. The illuminance sensor 65 receives external light from the front side of the user U wearing the display unit 20 through a hole provided in the front frame 27 of the display unit 20, and outputs a detection value corresponding to the amount of the received light or the intensity of the received light, for example.

The camera 61 is a digital camera including an image capturing element and an image capturing lens. The image capturing element is a CCD (Charge Coupled Device), a CMOS (Complementary Metal Oxide Semiconductor), or other elements, for example. The camera 61 captures the environment of the visual recognition range of the user corresponding to the orientation of the display unit 20 through the hole provided in the front frame 27 of the display unit 20, and generates captured image data, for example.

The line-of-sight sensor 67 is a sensor disposed at a position where the eye of the user U can be captured in the display unit 20, and is a camera that captures the pupil hole of the user U, for example. The line-of-sight sensor 67 outputs a detection value representing the line of sight of the user U, or a detection value including information that can identify the line of sight of the user U.

The OLED unit 104 includes an OLED light-emitting element and a driving circuit that drives the OLED light-emitting element, and outputs right image light toward the right light guide plate 26 based on a signal input from the interface 102.

The left display unit 24 includes the 9-axis sensor 25 and an OLED unit 114. The 9-axis sensor 25 is a sensor that detects triaxial acceleration, triaxial angular velocity and triaxial geomagnetism, and is an IMU (Inertial Measurement Unit) integrally including an acceleration sensor, a gyro sensor and a geomagnetic sensor, for example. The 9-axis sensor 25 detects the orientation and/or movement of the head of the user wearing the HMD 100 by detecting the acceleration, angular velocity and geomagnetism of the display unit 20.

As with the OLED unit 104, the OLED unit 114 includes an OLED light-emitting element and a driving circuit that drives the OLED light-emitting element. The OLED unit 114 outputs right image light toward the left light guide plate 28 based on a signal input from the interface 112.

The coupling device 10 includes the connector 11, an interface 202, an operation unit 208, a control unit 210, and a nonvolatile storage unit 240.

The communication cable 42 is coupled to the interface 202. The interface 202 exchanges the image and the detection value of the sensor with the right display unit 22 and with the left display unit 24.

The operation unit 208 includes a switch, a button or other operation parts provided on the case of the coupling device 10. When operated by the user U and the like, the operation unit 208 outputs an operation signal representing the content of the operation to the control unit 210.

The control unit 210 includes a processor 220 and a memory 230. The processor 220 is a computer with an arithmetic processing function. The processor 220 is composed of a CPU (Central Processing Unit) and/or a micro controller. The memory 230 is a storage unit that temporarily stores a program executed by the processor 220 and/or data processed by the processor 220, and is a RAM (random access memory), for example. The processor 220 may be a device integrated with the memory 230. In addition, the processor 220 is not limited to a single processor, and may be composed of a plurality of processors.

The nonvolatile storage unit 240 is a storage device that stores a program executed by the processor 220 and data processed by the processor 220 in a non-volatile manner. The nonvolatile storage unit 240 is composed of a magnetic recording device such as an HDD (Hard Disk Drive), or a semiconductor memory element such as a flash memory, for example.

The nonvolatile storage unit 240 stores a control program 241, a detection value processing program 242, and an algorithm language 243. The control program 241 achieves a function for the processor 220 to control each unit of the HMD 100. The detection value processing program 242 is a program for processing the detection values of various sensors provided in the display unit 20. The algorithm language 243 is provided from the host device 300 to the HMD 100. The algorithm language 243 will be described later.

The processor 220 controls each unit of the HMD 100 by executing the control program 241. More specifically, with the function of the control program 241, the processor 220 exchanges data with the host device 300, and exchanges signals and/or data with the right display unit 22 and the left display unit 24.

The processor 220 functions as an acquiring unit 221 and a data processing unit 222 by executing the control program 241 or other programs. The acquiring unit 221 and the data processing unit 222 are functional parts achieved in conjunction with software and hardware.

The data processing unit 222 acquires the detection value of the sensor mounted in the HMD 100. The data processing unit 222 generates sensor data based on the detection value of the sensor. The sensor data includes the detection value itself of one or more sensors, for example. In this case, the data processing unit 222 sets the detection value of one sensor as one sensor data. In addition, the data processing unit 222 may collectively set the detection values of a plurality of sensors as one sensor data. The data processing unit 222 transmits the sensor data including the detection value of the sensor to the host device 300 through the connector 11. The processing of transmitting the sensor data including the detection value of the sensor itself by the data processing unit 222 corresponds to an example of the first processing.

The data processing unit 222 can perform an arithmetic processing of the detection value of one or more sensors to generate sensor data including the result of the processing. For example, the data processing unit 222 acquires the detection value of one sensor in accordance with the sampling cycle set for each sensor, or acquires the detection value of one sensor for each predetermined period a plurality of sampling cycles. The data processing unit 222 obtains processed data by performing a computation processing on the acquired one or more detection values, and generates sensor data including the processed data. The data processing unit 222 transmits the sensor data including the processed data to the host device 300. The processing of transmitting the sensor data including the processed data by the data processing unit 222 corresponds to an example of the second processing.

The processed data includes results of an arithmetic processing for obtaining the average, difference, standard deviation and the like of a plurality of detection values obtained from one sensor, for example. In addition, the processed data may include the result of an integral processing of the detection values of a plurality of sensors. More specifically, the data processing unit 222 may determine the trajectory of the movement of the display unit 20 based on the detection value of the 9-axis sensor 25 to generate the three-dimensional coordinate data representing the trajectory. In this case, the processed data includes a plurality of the three-dimensional coordinate data.

The processor 220 functions as the data processing unit 222 by executing the detection value processing program 242. In view of this, the details of the arithmetic processing as the function of the data processing unit 222 are determined by the detection value processing program 242. The detection value processing program 242 includes a program representing the function of the data processing unit 222 in the default state, i.e., the initial state. For example, the data processing unit 222 has a function of executing first processing as a function in the initial state.

The function of the data processing unit 222 can be changed by the algorithm language 243.

The algorithm language 243 is data that defines the algorithm processing executed by the data processing unit 222. The algorithm language 243 may be referred to as algorithm language data. The algorithm language 243 is text data described using a programming language, for example. The algorithm language 243 may be described by a script language such as JavaScript, a compiler language such as C language, or other languages, and a proprietary language may be used, for example. The detailed format of the algorithm language 243 is not limited to the text data, and may be data in other formats. Java and JavaScript are registered trademarks.

The algorithm language 243 includes information that defines the processing of generating the sensor data by the data processing unit 222. For example, the algorithm language 243 includes parameters such as the type of the detection value to be processed by the data processing unit 222, the number of the detection values, the timing of the acquisition of the detection value, the details of processing on the detection value, and the threshold value used by the processing on the detection value. The type of the detection value is the type of the sensor that outputs the detection value, for example. In addition, in the case where the HMD 100 includes a sensor that can output a plurality of types of detection values, the type of the detection value is the combination of the sensor and the type of the detection value output by the sensor.

The acquiring unit 221 acquires the algorithm language transmitted by the host device 300. The acquiring unit 221 executes the procedure required for the host device 300 to transmit the algorithm language between the acquiring unit 221 and the host device 300. The acquiring unit 221 stores the algorithm language received from the host device 300 as the algorithm language 243 in the nonvolatile storage unit 240. The acquiring unit 221 analyzes the algorithm language 243. The acquiring unit 221 changes the content of the processing to be executed by the data processing unit 222 based on the algorithm language 243. For example, the acquiring unit 221 changes the processing to be executed by the data processing unit 222 from the initially set first processing to the second processing.

The acquiring unit 221 has a function of analyzing the algorithm language composed of text data and the like described in the script language and the like to convert it into a data structure that can be handled by the detection value processing program 242. For this function, it is possible to adopt a publicly known technique called parse (Parse), for example. In this case, the acquiring unit 221 functions as a parser.

The acquiring unit 221 may be provided as a function of the operating system of the coupling device 10. In addition, the acquiring unit 221 may be provided in the coupling device 10 as an application program to be executed on the operating system of the coupling device 10.

With the acquiring unit 221, the HMD 100 can change the content and/or type of the sensor data to be output to the host device 300. The algorithm language 243 is, for example, text data, and therefore the processing of transmitting the algorithm language 243 from the host device 300 can be easily executed in comparison with the processing of rewriting the control program 241 and the like. Thus, the mode of outputting the sensor data in the HMD 100 and the like can be easily changed.

Note that, all or part of the above-described functional elements provided in the control unit 210 may be configured with hardware each including one or more electronic circuit components. Such hardware may include programmed hardware such as a DSP (Digital Signal Processor) and a FPGA (Field Programmable Gate Array).

3. Configuration of Host Device

Figure 3:
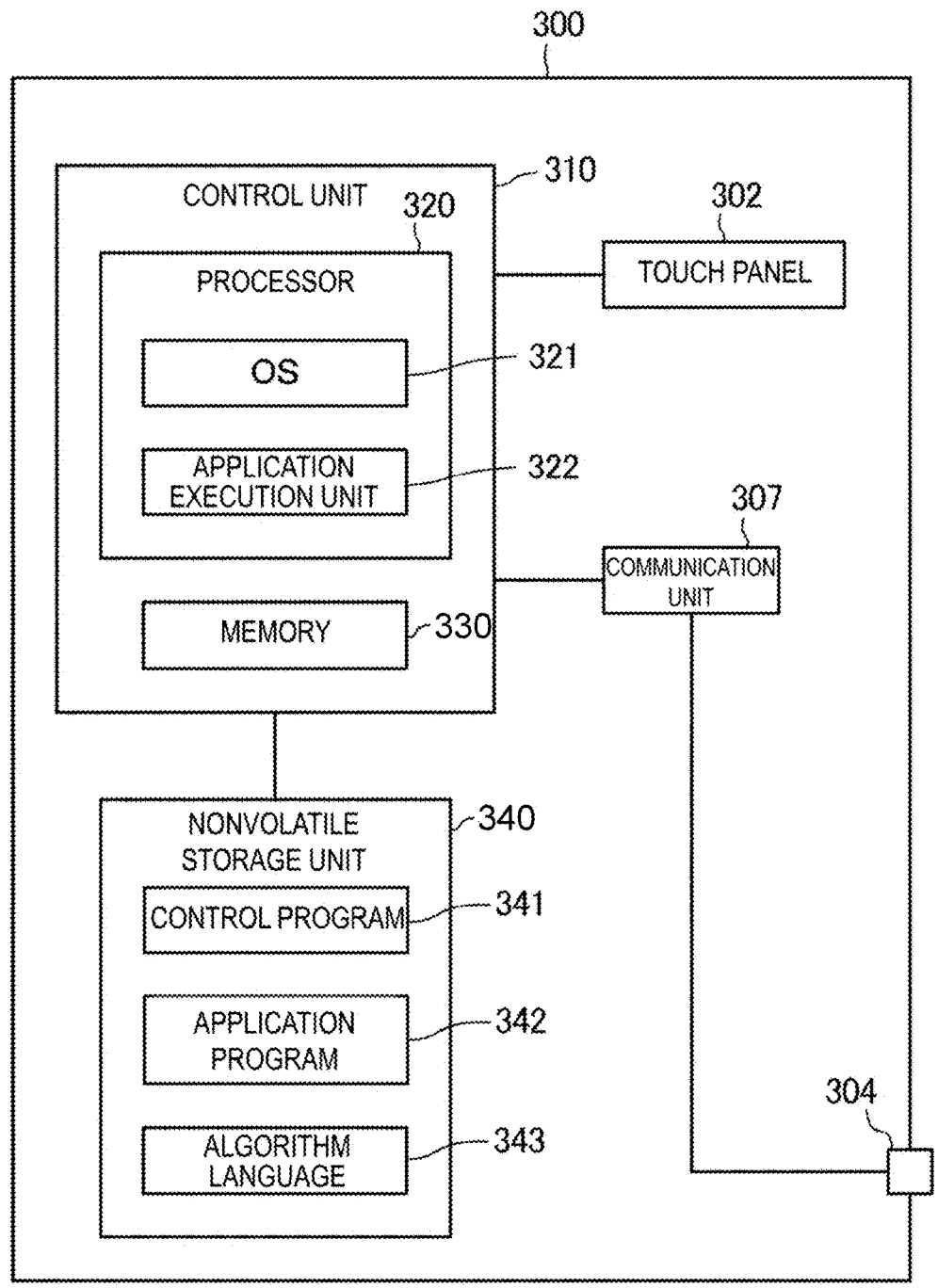
FIG. 3 is a block diagram illustrating a configuration of a host device.

FIG. 3 is a block diagram illustrating a configuration of the host device 300.

The host device 300 includes the touch panel 302, the connector 304, a communication unit 307, a control unit 310, and a nonvolatile storage unit 340.

FIG. 3 illustrates a part of the configuration of the host device 300, but this does not exclude the host device 300 including the configuration not shown in FIG. 3. For example, in the case where the host device 300 is a smartphone, the host device 300 includes a microphone, a speaker, a sound processing device and the like, but the illustration and the description of their configurations are omitted.

The communication unit 307 executes data communication through the connector 304 under the control of the control unit 310. The communication unit 307 executes a processing of transmitting an image to the HMD 100, a processing of receiving sensor data from the HMD 100, and various processes related to transmission of the algorithm language.

The control unit 310 includes a processor 320 and a memory 330. The processor 320 is a computer including an arithmetic processing function. The processor 320 is composed of a CPU and/or a micro controller, for example. The memory 330 is a storage unit that temporary stores a program executed by the processor 320 and/or data processed by the processor 320, and is a RAM, for example. The processor 320 may be a device integrated with the memory 330. In addition, the processor 320 is not limited to a single processor, and may be a plurality of processors.

The nonvolatile storage unit 340 is a storage device that stores in a non-volatile manner a program to be executed by the processor 320 and data to be processed by the processor 320. The nonvolatile storage unit 340 is composed of a magnetic recording device such as a HDD, or a semiconductor memory device such as a flash memory, for example.

The nonvolatile storage unit 340 stores a control program 341, an application program 342, and an algorithm language 343. The control program 341 implements a function for the processor 320 to control each unit of the host device 300. For example, the control program 341 provides the OS (operating system) of the host device 300. The application program 342 is a program to be executed on the OS. The algorithm language 343 is transmitted from the host device 300 to the HMD 100.

One application program 342 or two or more application programs 342 may be stored in the host device 300. The algorithm language 343 is stored in the nonvolatile storage unit 340 in association with the application program 342.

The processor 320 functions as an OS 321 and an application execution unit 322 by executing the control program 341. The OS 321 and the application execution unit 322 are functional parts achieved by a combination of software and hardware.

The OS 321 exchanges image and data with the HMD 100. The OS 321 provides a platform of the application program 342. The application execution unit 322 executes the application program 342. The application execution unit 322 executes a processing using sensor data transmitted by the HMD 100, for example. The application execution unit 322 corresponds to an example of the processing unit.

4. Operation of Display System

Figure 4:
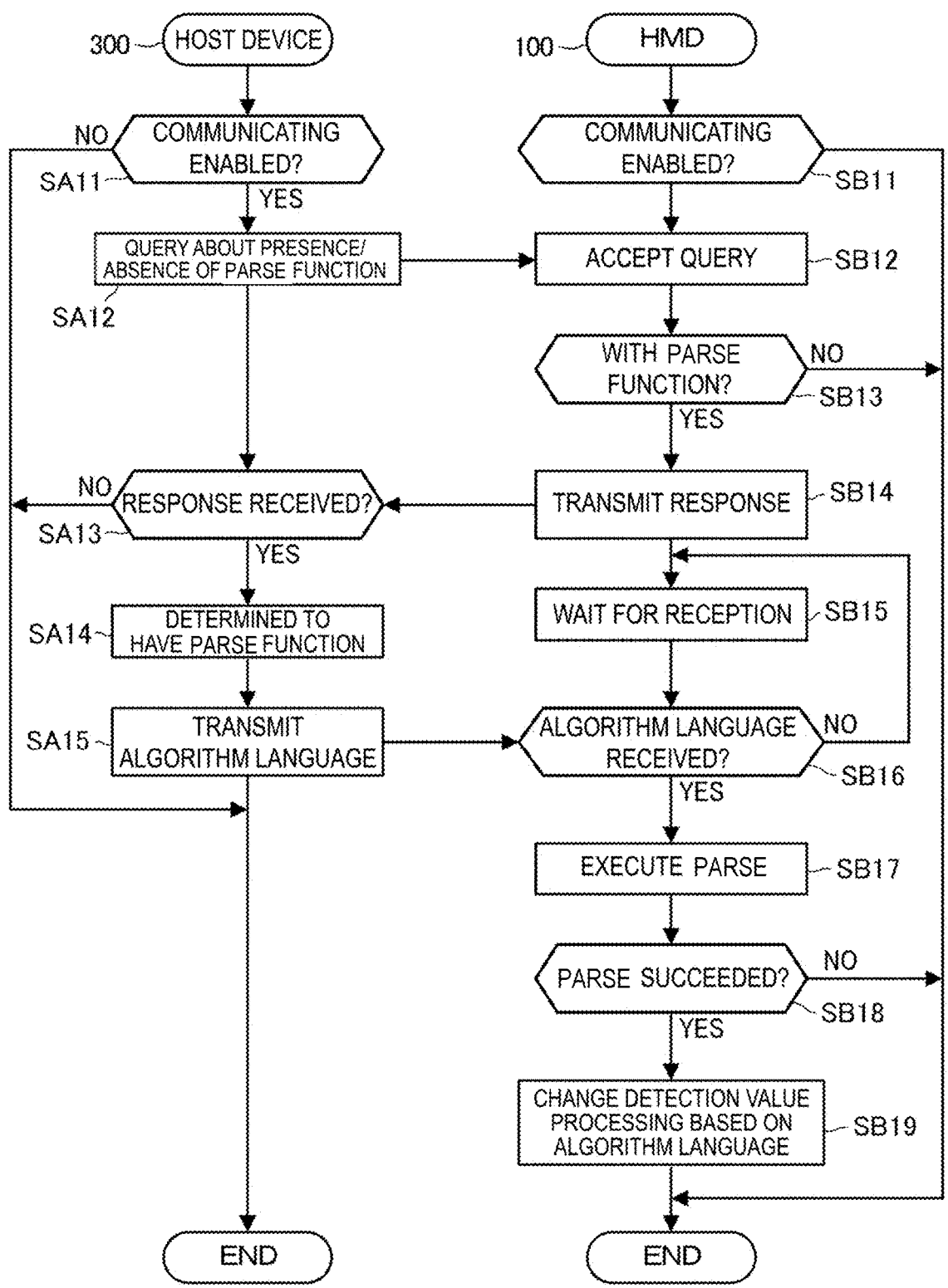
FIG. 4 is a sequence diagram illustrating an operation of the display system.

FIG. 4 is a sequence diagram illustrating an operation of the display system 1.

In FIG. 4, steps SA11 to SA15 represent the operation of the host device 300, and are executed by the OS 321. Steps SB11 to SB19 represent the operation of the HMD 100, and are executed by the acquiring unit 221.

The host device 300 determines whether serial communication with the HMD 100 through the communication cable 42 is viable (step SA11). Here, the HMD 100 determines whether serial communication with the host device 300 through the communication cable 42 is viable (step SB11). At steps SA11 and SB11, the HMD 100 and the host device 300 execute a communication protocol for determining the communication state to mutually determine whether the communication is viable, for example. When it is determined that the communication is not viable (step SA11; NO), the host device 300 terminates this processing. In addition, when it is determined that the communication is not viable (step SB11; NO), the HMD 100 terminates this processing.

When it is determined that the communication is viable (step SA11; YES), the host device 300 queries the HMD 100 about the presence/absence of the parse function (step SA12).

When queried about the presence/absence of the parse function from the host device 300, the HMD 100 accepts this query (step SB12). The HMD 100 determines whether the acquiring unit 221 has a parse function (step SB13). Step SB13 means that the acquiring unit 221 determines the function of the acquiring unit 221. For example, in the case where the HMD 100 has a parse function as a functional part different from the acquiring unit 221, the acquiring unit 221 unit determines the presence/absence of a functional part having a parse function at step SB13.

When determining that there is no parse function (step SB13; NO), the HMD 100 terminates this processing.

When determining that there is a parse function (step SB13; YES), the HMD 100 transmits a response to the host device 300 (step SB14).

The host device 300 determines whether there is a response from the HMD 100 (step SA13). The host device 300 determines that there is no response when there is no response in a predetermined time after the query to the HMD 100 (step SA13; NO). In this case, the host device 300 terminates this processing.

When it is determined that there is a response from the HMD 100 (step SA13; YES), the host device 300 determines that the HMD 100 has a parse function (step SA14). The host device 300 transmits the algorithm language 343 to the HMD 100 (step SA15). When executing the application program 342, the host device 300 in some cases executes the operation of FIG. 4 to cause the HMD 100 to generate sensor data matching the application program 342. In this case, at step SA15, the host device 300 transmits, to the HMD 100, the algorithm language 343 corresponding to the application program 342 that is being executed or to be executed.

After transmitting the response to the host device 300 at step SB14, the HMD 100 waits for receipt of the algorithm language (step SB15). The HMD 100 determines whether the algorithm language has been received (step SB16). When the algorithm language has not been received (step SB16; NO), the processing is returned to step SB15.

When the algorithm language has been received (step SB16; YES), the HMD 100 stores the received algorithm language as the algorithm language 243 in the nonvolatile storage unit 240, and executes a parse processing (step SB17). At step SB17, the HMD 100 analyzes the algorithm language 243 with the acquiring unit 221, and generates a program that changes or replaces the algorithm processing used by the data processing unit 222 for generating the sensor data.

The HMD 100 determines whether the parse processing of step SB17 has succeeded (step SB18). When it is determined that the parse processing has not succeeded (step SB18; NO), the HMD 100 terminates this processing. When it is determined that the parse processing has succeeded (step SB18; YES), the HMD 100 changes the content of the processing of the detection value processing program 242 for generating the sensor data by using the program generated at step SB17 (step SB19), and terminates this processing. Through the processing of step SB19, the content of the processing to be executed by the data processing unit 222 is changed.

Figure 5:
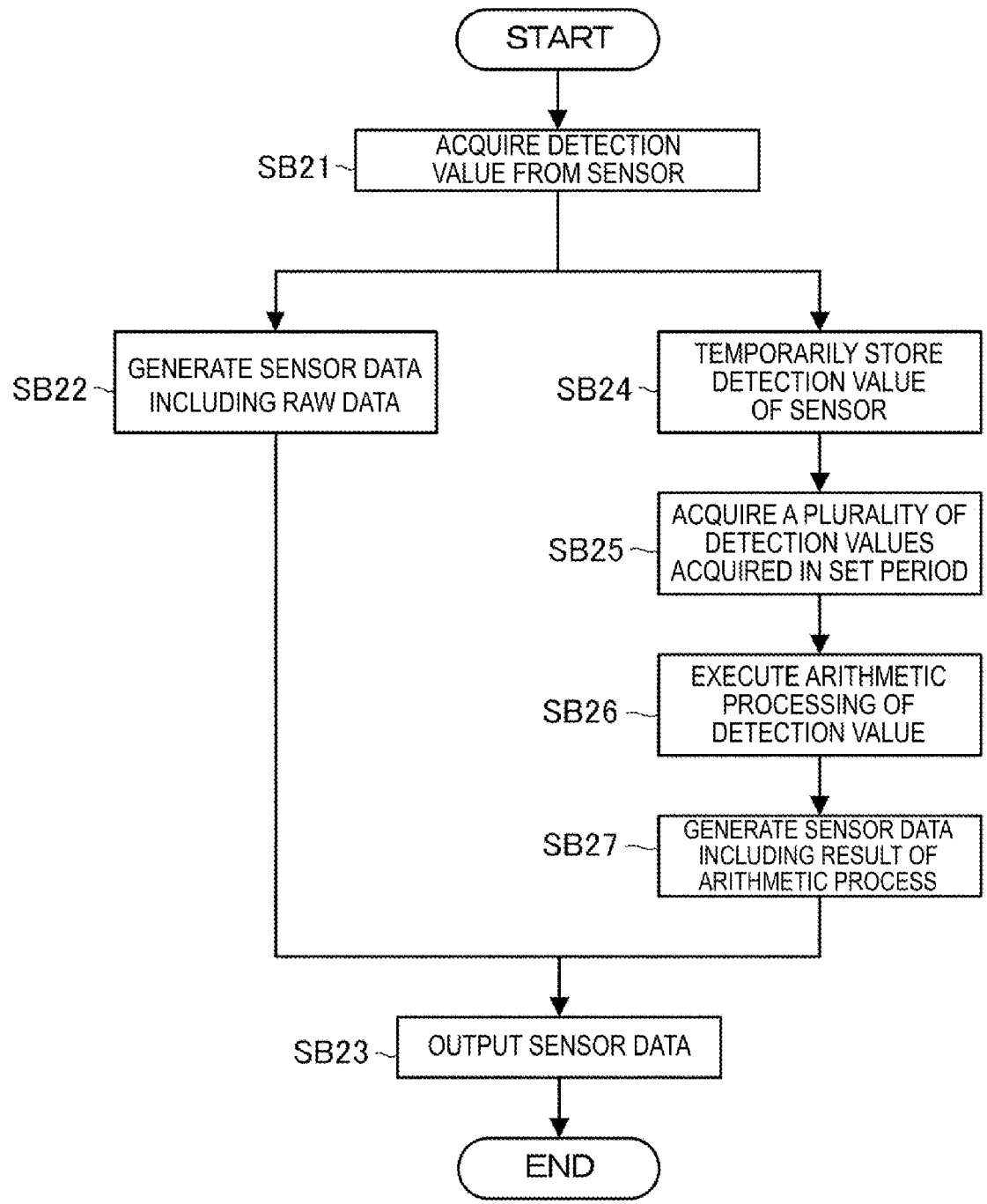
FIG. 5 is a flowchart of an example of an operation of the HMD.

FIG. 5 is a flowchart illustrating an example of an operation of the HMD 100.

Steps SB21 to SB27 of FIG. 5 represent an operation of the data processing unit 222. Steps SB21 to SB23 are an example of the operation of the data processing unit 222 in the initial state, and are an example of the first processing. Steps SB21, SB23, and SB24 to SB27 are an example of the operation of the data processing unit 222 after the change using the algorithm language 243, and correspond to an example of the second processing.

The HMD 100 acquires the detection value of the sensor provided in the HMD 100 (step SB21). At step SB21, it acquires the detection value of the sensor designated by the host device 300 among the 9-axis sensor 25, the camera 61, the illuminance sensor 65 and the line-of-sight sensor 67 of the HMD 100, for example.

When operating in the initial state, the data processing unit 222 proceeds to step SB22 to generate the detection value acquired at step SB21, i.e., sensor data including raw data (step SB22). The data processing unit 222 outputs the sensor data generated at step SB22 to the host device 300.

In addition, when the operation is changed by the algorithm language 243, the data processing unit 222 temporarily stores the detection value acquired at step SB21 in the memory 230 (step SB24). The data processing unit 222 acquires the detection value acquired in a set period among the detection values stored in the memory 230 (step SB25). The set period is a period designated by the algorithm language 243.

The data processing unit 222 executes the arithmetic processing designated by the algorithm language 243 for the detection value acquired in the set period (step SB26). The data processing unit 222 generates sensor data including the result of the arithmetic processing (step SB27). Thereafter, the data processing unit 222 transmits the sensor data generated at step SB27 to the host device 300 (step SB23).

As described above, the operation executed by the data processing unit 222 for the detection value can be changed by the algorithm language 243. In this manner, it is possible to cause the HMD 100 to generate the type of data required by the application program 342 of the host device 300.

For example, it is assumed that the application program 342 related to the line of sight of the user U is executed based on the detection value of the line-of-sight sensor 67 in the host device 300.

At steps SB24 to SB27, the HMD 100 generates and outputs sensor data including the result of the processing of the detection value of the line-of-sight sensor 67. For example, from the detection value of the line-of-sight sensor 67, the HMD 100 generates sensor data that represents the line-of-sight direction of the user U as coordinates and/or vectors in a three-dimensional space with respect to the position of the display unit 20. In this case, the processing load of the host device 300 can be suppressed, and the application program 342 that operates by using the line-of-sight direction of the user U can be executed in the host device 300. In this case, at step SB22, the HMD 100 outputs the sensor data including the detection value of the line-of-sight sensor 67. In this case, the processing delay for outputting the detection value of the line-of-sight sensor 67 from the HMD 100 to the host device 300 is very small, and therefore the host device 300 can advantageously acquire the detection value of the line-of-sight sensor 67 with a small delay. Examples of the application program 342 of the above-described examples include one that controls the convergence angle of the image displayed on the display unit 20 in accordance with the line-of-sight direction of the user U. The same applies to the detection value of the gyro sensor provided in the 9-axis sensor 25. Examples of the application program 342 using the detection value of the gyro sensor include one that performs a processing of detecting the position and/or state change of the display unit 20.

As described above, the HMD 100 can switch the algorithm executed by the data processing unit 222 between a simple processing with a small load of the processing related to the sensor data and a normal processing with a large load of the processing related to the sensor data. The simple processing is step SB22, and the normal processing is steps SB24 to SB27, for example. The display processing and the like that take advantage of the characteristics of the HMD 100 can be achieved by executing the simple processing when it is advantageous to transmit with a small delay the detection value of the sensor mounted in the HMD 100, and by executing the normal processing when it is necessary to perform a complex processing for the detection value of the sensor. This configuration is further favorable for processing the detection value of the line-of-sight sensor 67 and/or the 9-axis sensor 25, which are responsive to delay.

By using the algorithm language 243, the acquiring unit 221 can not only change the processing of the data processing unit 222 for generating the sensor data, but also change or add the processing to be executed by the data processing unit 222 by using the detection value of the sensor.

An example of such an operation is described below with reference to FIG. 6.

Figure 6:
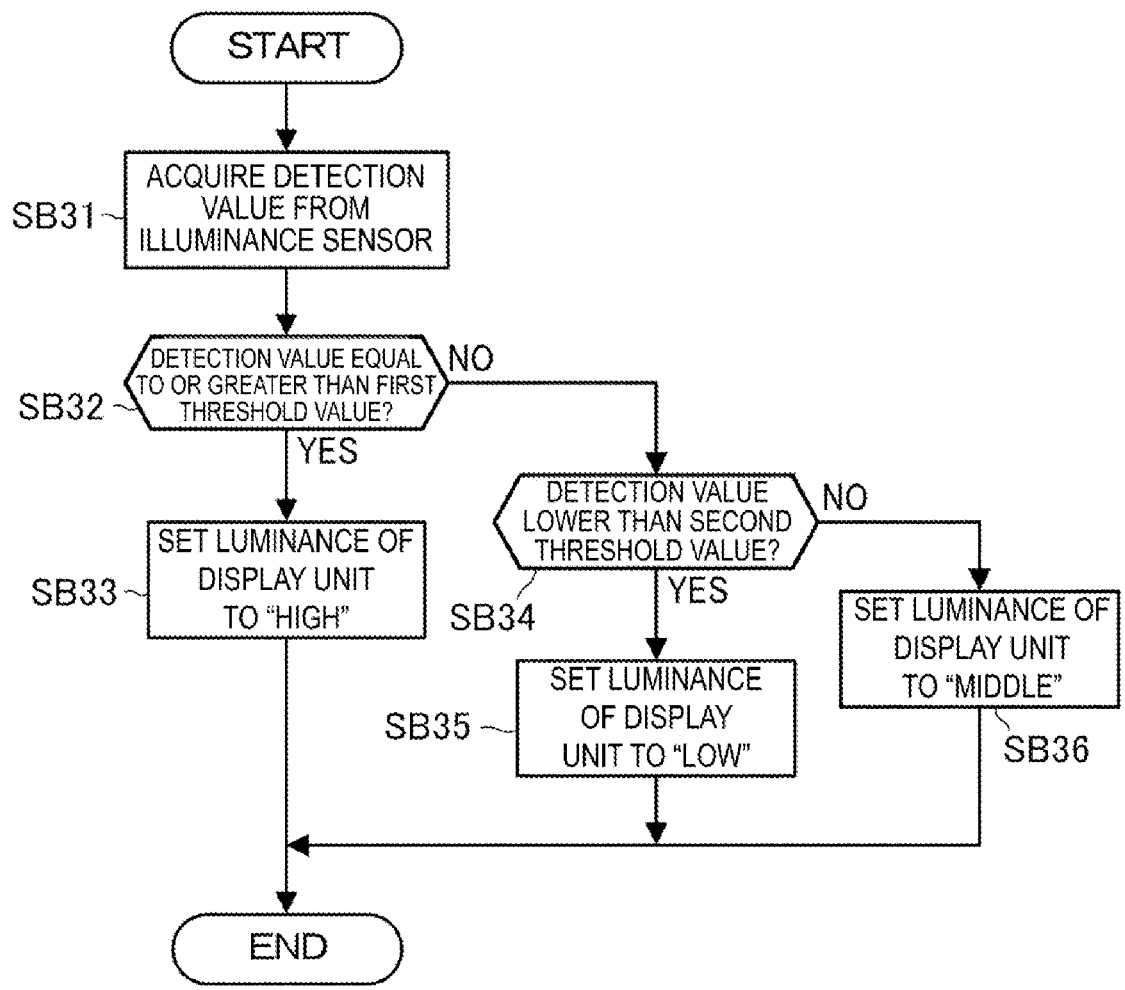
FIG. 6 is a flowchart of an example of an operation of the HMD.

FIG. 6 is a flowchart illustrating an example of an operation of the HMD 100. Steps SB31 to SB36 of FIG. 6 represent an example of a processing executed by the data processing unit 222. Regarding this process, the acquiring unit 221 causes the data processing unit 222 to execute this processing based on the algorithm language 243. The processing illustrated in FIG. 6 corresponds to an example of the third processing.

The operation of FIG. 6 is a processing of changing the display luminance of the display unit 20 in accordance with the detection value of the illuminance sensor 65, and is an example of a case where the display luminance of the display unit 20 can be changed in three levels, i.e., "high", "middle", and "low". Here, the display luminance of the display unit 20 is an index of the quantity of the image light emitted by the display unit 20 and is the index of the brightness of the display for the user U, which can be referred to as the light emission luminance of the OLED units 104 and 114, for example. The acquiring unit 221 sets the algorithm of the processing executed by the data processing unit 222 and a first threshold value and a second threshold value that are parameters used in the processing, in the data processing unit 222 based on the algorithm language 243.

The data processing unit 222 acquires the detection value from the illuminance sensor 65 (step SB31). The data processing unit 222 compares the acquired detection value with the first threshold value, and determines whether the detection value is equal to or greater than the first threshold value (step SB32). When the detection value is equal to or greater than the first threshold value (step SB32; YES), the data processing unit 222 sets the display luminance of the display unit 20 to "high" (step SB33).

When the detection value of the illuminance sensor 65 is not equal to or greater than the first threshold value (step SB32; NO), the data processing unit 222 compares the detection value with the second threshold value and determines whether the detection value is lower than the second threshold value (step SB34). When the detection value is lower than the second threshold value (step SB34; YES), the data processing unit 222 sets the display luminance of the display unit 20 to "low" (step SB35).

When the detection value of the illuminance sensor 65 is equal to or greater than the second threshold value (step SB34; NO), the data processing unit 222 sets the display luminance of the display unit 20 to "middle" (step SB36).

In this manner, the display system 1 can add and change the function of the HMD 100 by using the algorithm language 243 without rewriting the control program 241 of the HMD 100. The function added to the HMD 100 is not limited to the example of FIG. 6, and examples of the function include switching the detection range and changing the detection resolution of the 9-axis sensor 25 in accordance with the detection value of the 9-axis sensor 25, for example.

In addition, the examples may include a function of changing the display mode of the display unit 20 only in some of the HMDs 100 in the case where the display system 1 includes a plurality of the HMDs 100, for example. More specifically, a color tone adjustment function of changing the color tone of the image displayed by the display unit 20 is added to the HMD 100. In this case, while the color tone adjustment function is enabled, the HMD 100 executes the color tone adjustment function on the image received from the host device 300 and displays the adjusted image on the display unit 20. In addition, the HMD 100 to which the color tone adjustment function is not added displays the image received from the host device 300 as it is. With this function, it is possible to display images adjusted to color tones that are easily visually recognized in the HMD 100 that is used by the user U with visual impairment classified as color blindness and/or the user U with visual impairment classified as low vision. With this function, it is not necessary to adjust the image in the host device 300, and thus a typical image can be displayed in the HMD 100 that is used by the user U with normal color vision. In this case, it is desirable that the color tone adjustment function is applied to all images displayed on the display unit 20, and therefore the color tone adjustment function based on the algorithm language is executed regardless of the type of the application program 342 to be executed by the host device 300.

With the algorithm language, as a processing related to the detection value of the sensor mounted in the HMD 100, it is possible to separately use the first processing for executing more by the host device 300 and the second processing for executing more by the HMD 100 as described with reference to FIG. 5. For example, in the first processing exemplified in FIG. 5, the sensor data includes raw data. Therefore, the processing load of the HMD 100 is small, and the processing of the detection value is largely performed by the host device 300. In addition, in the second processing exemplified in FIG. 5, the result of the processing performed by the HMD 100 on the detection value is included in the sensor data. Thus, the processing load of the host device 300 is small, and the processing of the detection value is largely performed by the HMD 100.

The separate use of the first processing and the second processing mainly provides the following three effects.

The first effect is an effect of appropriately using the difference in data processing capacities between the HMD 100 and the host device 300. By causing one of the HMD 100 and the host device 300 with higher data processing capacity than the other to execute more processes, the balance of the processing load in the display system 1 can be optimized. For example, for a configuration in which the plurality of HMDs 100 and one host device 300 are coupled, it is conceivable that the host device 300 processes the sensor data of the plurality of HMDs 100. In this case, by causing the HMD 100 to execute more processes related to the detection value of the sensor, the processing load of the host device 300 can be reduced and the processing speed of the entire display system 1 can be set to an appropriate state.

The second effect is an effect of enhancing the efficiency of the transmission control between the HMD 100 and the host device 300. It is conceivable that the capacity of the sensor data output by the HMD 100 in the second processing is smaller than the sensor data including raw data. Therefore, in the case where the speed and band of the communication means for coupling the HMD 100 and the host device 300 is limited, the delay of the communication and the like can be prevented and the sensor data can be efficiently transmitted by causing the HMD 100 to execute the second processing. In addition, it is possible to cause the HMD 100 to execute the first processing in the case where the HMD 100 takes a time for processing the detection value of the sensor, and/or for the purpose of allowing the host device 300 to acquire the sensor data with a small delay. In this case, the time period from acquisition of the detection value of the sensor at the HMD 100 to acquisition of the sensor data at the host device 300 can be shortened.

The third effect is that the management of the battery capacity of the HMD 100 and the host device 300 can be advantageously optimized. As described for the first effect, the balance of the processing load of the HMD 100 and the host device 300 can be changed by separately using the first processing and the second processing. Therefore, the operative time of the HMD 100 and the host device 300 can be appropriately adjusted by separately using the first processing and the second processing in accordance with the remaining battery capacity of the HMD 100 and the host device 300. In this manner, for example, the stoppage of the display system 1 due to the limitation of the battery capacity can be avoided.

5. Other Embodiments

The present disclosure is not limited to the configuration of the above embodiment, but can be implemented in various forms to the extent that it does not depart from the gist thereof.

In the above-described embodiment, the nonvolatile storage unit 240 may preliminarily store the algorithm language 243 for specifying the default function of the data processing unit 222, for example. In this case, by causing the data processing unit 222 to refer to the default algorithm language 243, the data processing unit 222 can execute the default function. For example, even in the state where the acquiring unit 221 cannot acquire the algorithm language 243, the HMD 100 can execute the operation. In addition, in this configuration, advantageously, another program for the default function of the data processing unit 222 is unnecessary, and it is not necessary for the data processing unit 222 to have the default function.

In addition, while the algorithm language 243 acquired by the acquiring unit 221 is stored in the nonvolatile storage unit 240 in the above-described embodiment, the algorithm language 243 may be stored in the memory 230. For example, the algorithm language 243 may be created by using simple programming tools called no-code tool or low-code tool in the HMD 100 or other devices. In this case, it is possible to adopt a configuration in which the algorithm language 243 created in the HMD 100 is retained in the memory 230, and the data processing unit 222 executes the algorithm language 243 retained in the memory 230.

While one HMD 100 is coupled to one host device 300 through the communication cable 42 in the display system 1 in the above-described embodiment, the plurality of HMDs 100 and one or more host devices 300 may be coupled through wireless communications, for example.

In the above-described embodiment, the HMD 100 may have a sound outputting function for outputting sound. In this case, the HMD 100 may execute an operation of changing the output mode of sound such as the volume, the sound quality, and the presence/absence of equalizer functions in accordance with the detection value of the sensor provided in the HMD 100 based on the algorithm language 243.

In addition, while the left and right eyes of the user U are caused to visually recognize an image with the right display unit 22 and the left display unit 24 in the above-described embodiment, this is merely an example. The HMD 100 may be a display device for one eye that causes one of the right eye and left eye of the user U to visually recognize an image. In addition, the HMD 100 is not limited to be directly worn on the body of the user U, but may be worn on the closing of the user U including the cloths and helmet.

In addition, while a head-mounted display device configured to be worn on the head of the user U is described as an example of the display device in the above-described embodiment, the display device to which the present disclosure is applied is not limited to this. Naturally, the present disclosure is also applicable to displays including a liquid crystal display panel or an OLED panel, or projectors that projects image light, for example.

In addition, while a configuration of the HMD 100 in which the display unit 20 and the coupling device 10 are separated from each other in the above-described embodiment is exemplified in the above-described embodiment, this merely an example. The HMD 100 may have a configuration in which the display unit 20 and the coupling device 10 are integrated with each other. For example, it is possible to adopt a configuration in which the functional part provided in the coupling device 10 is incorporated in the main body of the display unit 20. In addition, it is possible to adopt a configuration in which the display unit 20 and the coupling device 10 are coupled to each other through radio communication in the HMD 100.

Each functional part of the HMD 100 illustrated in FIG. 2 and each functional part of the host device 300 illustrated in FIG. 3 represent functional configurations, and details of the implementation is not limited. It is not necessary to provide hardware individually corresponding to each functional part illustrated in these drawings, and it is naturally possible to adopt a configuration in which the functions of a plurality of functional parts are achieved when one processor executes a program. In addition, a part of the function achieved with software in the above-described embodiments may be achieved with hardware, while a part of the function achieved with hardware may be achieved with software.

In addition, the unit of the processing in the sequence diagram of FIG. 4 and the flowchart of FIGS. 5 and 6 is divided in accordance with the details of the main processing for the purpose of easy understanding of the processing of the HMD 100 and the host device 300, and the present disclosure is not limited to the name and the division of the unit of the processing. The processing may be divided into a larger number of the units of the processing in accordance with the content of the processing, and one unit of the processing may be further divided to include a number of subroutine processing. In addition, the order of the units of the processing in the above-described flowchart is not limited to the illustration of the drawings.

The control program 241 and the control program 341 may be recorded in a recording medium that is readable by the HMD 100 or the host device 300. As the recording medium, magnetic and optical recording mediums or semiconductor memory devices may be used. In addition, the above-described control method may be achieved by storing the programs in a server device or the like and downloading the control program from the server device.

6. Configurations Described by Embodiments

The above-described embodiments describe the following configuration.
Configuration 1
A control device including a device coupling unit coupled to an electronic device, and a processing unit configured to execute an application program configured to process sensor data related to a sensor provided in the electronic device, in which the electronic device determines whether an algorithm language related to processing of a detection value of the sensor is receivable, and transmits the algorithm language to the electronic device when determining that the algorithm language is receivable.

With the control device of Configuration 1, by transmitting the algorithm language to the electronic device including the sensor, it is possible to cause it to execute the processing of the detection value of the sensor based on the algorithm language. In this manner, the function related to the detection value of the sensor can be changed among the functions of the electronic device.
Configuration 2
The control device according to configuration 1, in which a query about whether the algorithm language is receivable is made to the electronic device, and whether the algorithm language is receivable is determined based on a response of the electronic device to the query.

With the control device of Configuration 2, unnecessary operations can be avoided by determining whether the electronic device supports the change of the processing based on the algorithm language.
Configuration 3
An electronic device configured to be worn and used by a user, the electronic device including a sensor, a terminal coupling unit coupled to a control device, a data processing unit configured to generate sensor data by processing a detection value of the sensor, and transmit the generated sensor data to the control device by the terminal coupling unit, and an acquiring unit configured to acquire an algorithm language transmitted from the control device, in which the data processing unit determines a processing of a detection value of the sensor based on the algorithm language acquired by the acquiring unit, and generates the sensor data by executing the determined processing.

With the electronic device of Configuration 3, the electronic device provided with the sensor can change the processing related to the detection value of the sensor by using the algorithm language.
Configuration 4
The electronic device according to configuration 3, further including a response unit configured to transmit, to the control device, a response indicating that the algorithm language is receivable when a query about whether the algorithm language is receivable is received from the control device, and the data processing unit determines that the algorithm language is receivable through a determination whether the algorithm language is receivable.

With the electronic device of Configuration 4, since the query of the control device is supported, the processing related to the detection value of the sensor can be changed by using the algorithm language transmitted from the control device.
Configuration 5
The electronic device according to configuration 3 or 4, in which the data processing unit is configured to process the detection value of the sensor by executing a detection value processing program by a processor, and identifies program structure of a script through a parse of the script, and dynamically changes processing in the detection value processing program based on the program structure of the script before execution of the detection value processing program, the script being the algorithm language acquired by the acquiring unit.

With the electronic device of Configuration 5, it is possible to easily change the processing executed by the electronic device for the detection value of the sensor by using the parse function for scripts.
Configuration 6
The electronic device according to configuration 5, in which based on the algorithm language, the data processing unit executes the processing in the detection value processing program by switching the processing of the detection value processing program between a first processing of transmitting the sensor data including the detection value of the sensor to the control device and a second processing of transmitting the sensor data including processed data obtained by processing the detection value of the sensor to the control device.

With the electronic device of Configuration 6, it is possible to switch between the first processing of transmitting the sensor data including the detection value of the sensor and the second processing of transmitting the sensor data including the processed data. In this manner, the balance of the load between the control device and the electronic device can be changed.

Configuration 7

The electronic device according to configurations 1 to 6, further including a display unit configured to display an image, and be worn on a head of the user, and a display control unit configured to adjust a display state in the display unit based on the detection value of the sensor, in which the sensor includes an illuminance sensor configured to detect an illuminance of an environment of the display unit, and based on a detection value of the illuminance sensor, the data processing unit executes a third processing of generating a brightness adjustment value for the display control unit to adjust a brightness of a display of the display unit based on the algorithm language.

With the electronic device of Configuration 7, in the head-mounted display device, the processing related to the detection value of the sensor provided in the display device can be easily changed by using the algorithm language in the display device.

Configuration 8

A head-mounted display device including a display unit configured to be worn on a head of a user and configured to display an image, a sensor mounted in the display unit, a terminal coupling unit coupled to a control device, a data processing unit configured to generate sensor data by processing a detection value of the sensor, and transmit the generated sensor data to the control device by the terminal coupling unit, and an acquiring unit configured to acquire an algorithm language transmitted from the control device, in which based on the algorithm language acquired by the acquiring unit, the data processing unit executes a first processing and a second processing by switching between the first processing and the second processing, the first processing being a processing of transmitting the sensor data including the detection value of the sensor to the control device, the second processing being a processing of generating and transmitting, to the control device, the sensor data including processed data obtained by processing the detection value of the sensor.

With the head-mounted display device of Configuration 8, the first processing and the second processing can be switched and executed based on the detection value of the sensor of the display unit worn on the user, and the detection value can be used in the control device. In this manner, the processing can be switched in accordance with the value of the delay in transmission of the sensor data to the first processing and the balance of the processing load between the control device and the head-mounted display device for the processing of the sensor data. In this manner, the detection value of the sensor of the head-mounted display device can be used in a mode with less delay and/or a mode with less processing load of the control device in the control device.

Configuration 9

A control method configured to be executed by a control device coupled to an electronic device, the control method including determining, by the electronic device, whether an algorithm language related to processing of a detection value of a sensor is receivable, transmitting the algorithm language to the electronic device when determining that the algorithm language is receivable, receiving sensor data, the sensor data being data transmitted by the electronic device based on the algorithm language and related to a sensor provided in the electronic device, and processing the sensor data with an application program.

With the control method with the configuration 9, the function executed for the detection value of the sensor by the electronic device including the sensor can be easily changed.

Configuration 10

A control program configured to be executed by a processor provided in a control device coupled to an electronic device, the control program being configured to cause the processor to execute steps of: determining, by the electronic device, whether an algorithm language related to processing of a detection value of a sensor is receivable, transmitting the algorithm language to the electronic device when determining that the algorithm language is receivable, receiving sensor data, the sensor data being data transmitted by the electronic device based on the algorithm language and related to a sensor provided in the electronic device, and processing the sensor data with an application program.

With the program of Configuration 10, the function executed for the detection value of the sensor by the electronic device including the sensor can be easily changed.

What is claimed is:

1. A control device comprising:
   a device coupling unit coupled to an electronic device; and
   a processing unit configured to execute an application program configured to process sensor data related to a sensor provided in the electronic device, wherein
   the control device determines whether the electronic device has a function for parsing an algorithm language related to processing of a detection value of the sensor by transmitting a query to the electronic device, and the control device transmits the algorithm language to the electronic device when determining that the electronic device has the function for parsing the algorithm language, wherein the algorithm language changes content of processing of the application program on a detection value of the sensor.

2. The control device according to claim 1, wherein whether the electronic device has the function for parsing the algorithm language is determined based on a response of the electronic device to the query.

3. An electronic device configured to be worn and used by a user, the electronic device comprising:
   a sensor;
   a terminal coupling unit coupled to a control device;
   a data processing unit configured to generate sensor data by processing a detection value of the sensor, and transmit the generated sensor data to the control device by the terminal coupling unit; and
   an acquiring unit configured to acquire an algorithm language transmitted from the control device, wherein
   the data processing unit determines a processing of a detection value of the sensor by parsing the algorithm language acquired by the acquiring unit, and generates the sensor data by executing the determined processing.

4. The electronic device according to claim 3, further comprising a response unit configured to transmit, to the control device, a response indicating that the algorithm language is receivable when a query about whether the algorithm language is receivable is received from the control device, and the data processing unit determines that the algorithm language is receivable through a determination whether the algorithm language is receivable.

5. The electronic device according to claim 3, wherein the data processing unit is configured to process the detection value of the sensor by executing a detection value processing program by a processor, and
identifies a program structure of a script through a parse of the script, and dynamically changes processing in the detection value processing based on the program structure of the script before execution of the detection value processing program, the script being the algorithm language acquired by the acquiring unit.

6. The electronic device according to claim 5, wherein based on the algorithm language, the data processing unit executes the processing in the detection value processing program by switching between a first processing of transmitting the sensor data including the detection value of the sensor to the control device and a second processing of transmitting the sensor data including processed data obtained by processing the detection value of the sensor to the control device.

7. The electronic device according to claim 6, further comprising:
a display unit configured to display an image, and be worn on a head of the user; and
a display control unit configured to adjust a display state of the display unit based on the detection value of the sensor, wherein
the sensor includes an illuminance sensor configured to detect an illuminance of an environment of the display unit, and
based on a detection value of the illuminance sensor, the data processing unit executes a third processing of generating a brightness adjustment value for the display control unit to adjust a brightness of a display of the display unit based on the algorithm language.

8. A head-mounted display device comprising:
a display unit configured to be worn on a head of a user and configured to display an image;
a sensor mounted in the display unit;
a terminal coupling unit coupled to a control device;
a data processing unit configured to generate sensor data by processing a detection value of the sensor, and transmit the generated sensor data to the control device by the terminal coupling unit; and
an acquiring unit configured to acquire an algorithm language transmitted from the control device, wherein based on the algorithm language acquired by the acquiring unit, the data processing unit is configured to switch between a first processing and a second processing,
wherein the first processing being a processing of transmitting the sensor data including the detection value of the sensor to the control device by executing detection value processing program stored in a memory, the second processing being a processing of generating and transmitting, to the control device, the sensor data including processed data obtained by processing the detection value of the sensor, wherein the second processing is executed by executing the algorithm language.

9. A control method configured to be executed by a control device coupled to an electronic device, the control method comprising:
determining whether the electronic device has a function for parsing an algorithm language related to processing of a detection value of a sensor;
transmitting the algorithm language to the electronic device when determining that the electronic device has the function for parsing the algorithm language is receivable;
receiving sensor data, the sensor data being data transmitted by the electronic device based on the algorithm language and related to a sensor provided in the electronic device; and
processing the sensor data with an application program.

10. A non-transitory computer-readable storage medium storing a control program configured to be executed by a processor provided in a control device coupled to an electronic device, the control program being configured to cause the processor to execute steps of:
determining whether the electronic device has a function for parsing an algorithm language related to processing of a detection value of a sensor;
transmitting the algorithm language to the electronic device when determining that the electronic device has the function for parsing the algorithm language;
receiving sensor data, the sensor data being data transmitted by the electronic device based on the algorithm language and related to a sensor provided in the electronic device; and
processing the sensor data with an application program.

* * * * *